(12) United States Patent
Downing et al.

(10) Patent No.: US 10,538,399 B2
(45) Date of Patent: Jan. 21, 2020

(54) CONTAINER HANDLER FORK ASSEMBLY IMPROVEMENTS

(71) Applicant: Wastequip, LLC, Charlotte, NC (US)

(72) Inventors: John Jason Downing, Winamac, IN (US); Nicholas Stephen Franiak, Francesville, IN (US); Warren Malcolm Cole, Columbia City, IN (US); Steven J. Kopka, Winamac, IN (US); Matthew Mock, Peru, IN (US)

( * ) Notice: Subject to any disclaimer, the term of this patent is extended or adjusted under 35 U.S.C. 154(b) by 0 days.

(21) Appl. No.: 15/834,179

(22) Filed: Dec. 7, 2017

(65) Prior Publication Data

US 2019/0177098 A1 Jun. 13, 2019

(51) Int. Cl.
*B65G 65/23* (2006.01)
*B66F 9/19* (2006.01)

(52) U.S. Cl.
CPC .............. *B65G 65/23* (2013.01); *B66F 9/19* (2013.01)

(58) Field of Classification Search
CPC . B65G 65/23; B65F 1/22; B65F 1/122; B65F 3/04; B65F 3/043; B65F 3/201; B66F 9/19
USPC ................................ 414/422, 404, 406, 408
See application file for complete search history.

(56) References Cited

U.S. PATENT DOCUMENTS

| | | | | |
|---|---|---|---|---|
| 4,349,305 A | * | 9/1982 | Wynn ....................... | B65F 3/04 414/403 |
| 4,363,588 A | * | 12/1982 | Stickney ................. | B65F 1/122 414/408 |
| 4,699,557 A | * | 10/1987 | Barnes ....................... | B65F 3/04 414/408 |
| 4,986,716 A | * | 1/1991 | Winter ....................... | B65F 3/08 100/218 |
| 5,059,081 A | * | 10/1991 | Brown .................... | B65F 3/041 414/408 |
| 5,088,875 A | | 2/1992 | Galbreath et al. | |
| 5,333,984 A | * | 8/1994 | Bayne ....................... | B65F 3/08 414/408 |
| 5,806,911 A | | 9/1998 | Haddad, Jr. | |
| 6,123,497 A | * | 9/2000 | Duell ....................... | B65F 3/043 414/406 |
| 6,332,745 B1 | * | 12/2001 | Duell ....................... | B65F 3/043 414/406 |
| 6,648,576 B1 | | 11/2003 | Duell et al. | |
| 8,297,904 B1 | * | 10/2012 | Schroeder ............... | B66F 9/065 414/471 |
| 9,004,842 B2 | | 4/2015 | Downing et al. | |

(Continued)

*Primary Examiner* — Kaitlin S Joerger
(74) *Attorney, Agent, or Firm* — Nelson Mullins Riley & Scarborough LLP

(57) ABSTRACT

Container handlers including improved fork assemblies. One embodiment includes a vehicle having a chassis and a hoist apparatus pivotably coupled with the chassis. The hoist apparatus is movable between a stowed position and an extended position with respect to the chassis. The hoist apparatus further includes a pivotable fork assembly. The fork assembly comprises a frame and a carriage movably coupled with the frame. One or more tines are coupled with the carriage. At least one actuator is coupled between the frame and the carriage and is operative to move between a first position and a second position. Movement of the at least one actuator from the first position toward the second position causes the carriage to move substantially parallel to the frame.

17 Claims, 16 Drawing Sheets

(56) References Cited

U.S. PATENT DOCUMENTS

| | | | |
|---|---|---|---|
| 9,126,755 B2* | 9/2015 | Walter | B65F 1/1452 |
| 9,545,868 B1* | 1/2017 | Downing | B60P 1/48 |
| 9,611,685 B2* | 4/2017 | Curotto | B65F 1/1638 |
| 9,802,757 B2* | 10/2017 | Curotto | B65F 1/1638 |
| 2006/0280582 A1* | 12/2006 | Kouri | B65F 3/043 |
| | | | 414/408 |
| 2006/0285952 A1 | 12/2006 | Galbreath et al. | |
| 2009/0025378 A1 | 1/2009 | Laumer et al. | |
| 2015/0093223 A1* | 4/2015 | Parker | B65F 3/041 |
| | | | 414/408 |
| 2015/0291355 A1* | 10/2015 | Cardoso Cabral Martins Da Silva | B65F 1/12 |
| | | | 414/409 |
| 2016/0347228 A1 | 12/2016 | Franiak et al. | |

* cited by examiner

CONTAINER HANDLER FORK ASSEMBLY IMPROVEMENTS

FIELD OF THE INVENTION

Embodiments of the present invention relate to container handlers for loading, handling, and/or transporting containers for solid and liquid waste products. In particular, embodiments of the invention relate to an improved fork assembly of a container handler used to engage such containers.

BACKGROUND

Vehicles including a hoist apparatus for loading containers or other items onto the vehicle and for unloading the containers or other items therefrom are known. In particular, one such vehicle may be referred to as a container handler or a loaded container handler. Such vehicles typically comprise a hoist apparatus carried on a wheeled chassis that is actuated by pressurized fluid selectively directed by manual controls. Conventionally, the hoist apparatus includes a fork assembly carried at the distal end of a lifting arm, and a pair of fork tines are fixedly mounted to the fork assembly. The entire fork assembly is usually pivotable with respect to the lifting arm via a hydraulic cylinder. Further, the lifting arm itself is usually pivotable or extendable toward and away from the vehicle chassis via one or more additional hydraulic cylinders. In some cases, the fork assembly may be rotatable with respect to the lifting arm to effect dumping of a container.

When the vehicle is at a stop, the lifting arm and fork assembly are manipulated to bring the tines of the fork assembly into engagement with a container. The container is then elevated through coordinated movement of the lifting arm and fork assembly to position the container on the chassis. Some container handling vehicles may contain a "hopper" over which the container can be positioned to deposit refuse in the hopper.

SUMMARY

According to one embodiment, the present invention provides a vehicle comprising a chassis and a hoist apparatus pivotably coupled with the chassis. The hoist apparatus is movable between a stowed position and an extended position with respect to the chassis. The hoist apparatus further comprises a pivotable fork assembly. The fork assembly comprises a frame and a carriage movably coupled with the frame. One or more tines are coupled with the carriage. At least one actuator is coupled between the frame and the carriage, and the at least one actuator is operative to move between a first position and a second position. Movement of the at least one actuator from the first position toward the second position causes the carriage to move substantially parallel to the frame.

According to a further embodiment, the present invention provides a container handler comprising a first frame and at least one lift arm coupled with the first frame. At least one first actuator is operative to move the at least one lift arm with respect to the first frame. The container handler also comprises a fork assembly coupled with the at least one lift arm. The fork assembly comprises a second frame and carriage operative to move between a first position and a second position with respect to the second frame. The carriage carries a pair of tines. Each tine extends generally orthogonally from the carriage through a respective slot defined in the second frame. The fork assembly further comprises at least one second actuator coupled with the carriage, and the least one second actuator is operative to move between a retracted position and an extended position. Movement of the at least one second actuator from the retracted position causes the carriage to move with respect to the second frame between the first and second positions.

According to yet another embodiment, the present invention provides a vehicle. The vehicle comprises a chassis and at least one lift arm pivotably coupled with the chassis. The at least one lift arm is movable between a stowed position and an extended position with respect to the chassis based on actuation of at least one first linear actuator coupled between the chassis and the at least one lift arm. The at least one lift arm further comprises a fork assembly coupled thereto. The fork assembly comprises a frame and a pair of tines. The frame is pivotable with respect to the at least one lift arm in response to actuation of at least one second linear actuator coupled between the frame and the at least one lift arm. The tines are operative to vertically translate with respect to the frame in response to actuation of at least one third linear actuator.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
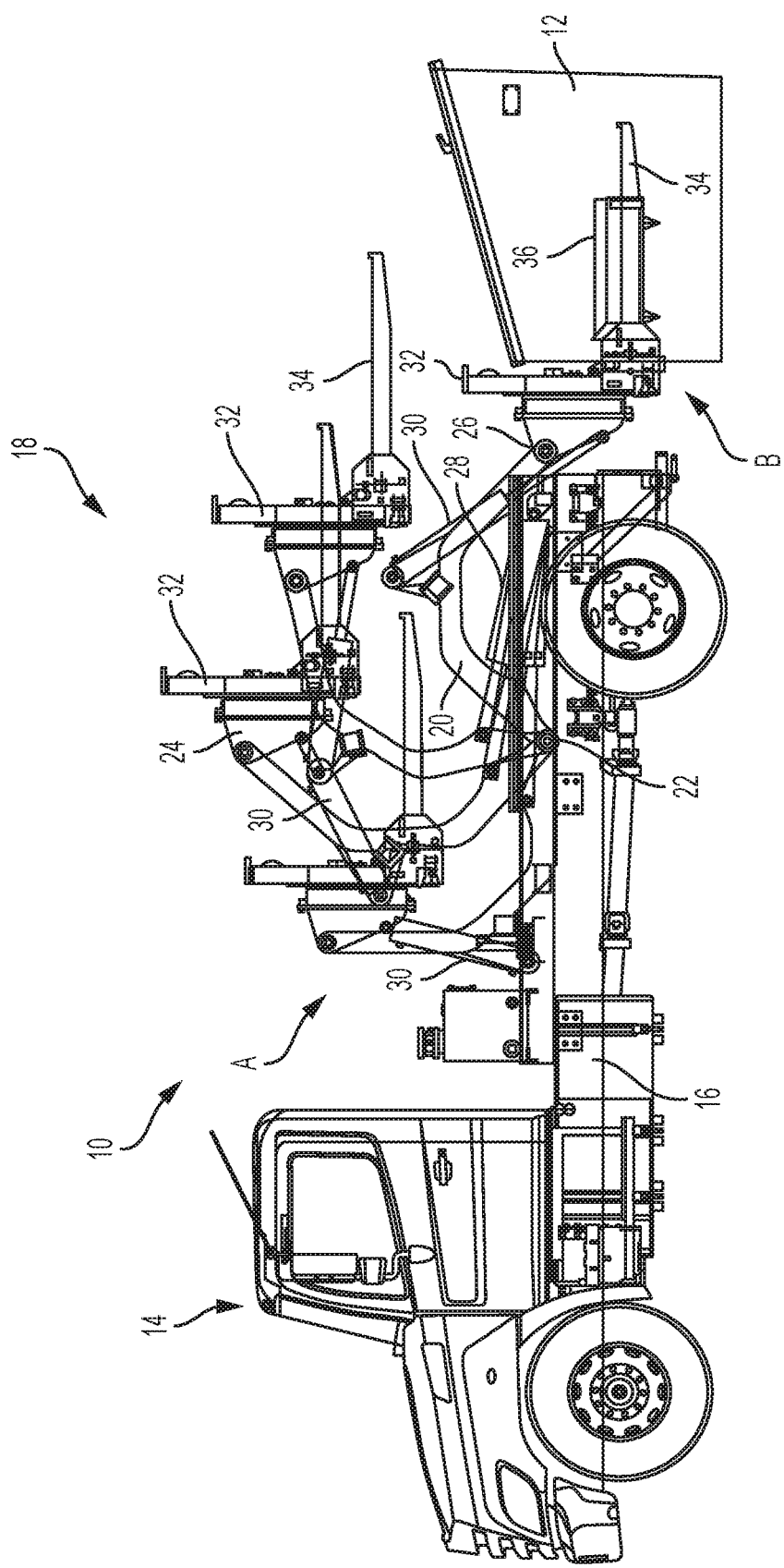
FIG. 1 is a schematic elevation of a vehicle with which an embodiment of the present invention may be utilized.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Currently, the fork tines on fork assemblies of container handlers are not automatically adjustable, but rather are in a fixed position on the fork assembly. To move the tines into engagement with a container, an operator must manually adjust controls (such as levers or a joystick) to control movement of the lift arm and fork assembly of the hoist apparatus to a position wherein the tines of the fork assembly are in engagement with corresponding fork pockets on the container (or a similar structure for handling the container, such as a lip or trunnion bars). However, different containers may have fork pockets or other complementary structure in different configurations on the container, such as at different heights (with respect to the base of the container) or in different orientations. Having a fork assembly with fixed fork tines is problematic because, depending on the position and orientation of the handling structure of a container, the tines may not be able to engage with the container to lift it at all, or the hoist apparatus may not be able to safely load and transport the container on a vehicle.

Accordingly, embodiments of the invention relate to an improved fork assembly for a container handler. In one embodiment, the fork assembly may comprise a pair of fork tines coupled with one or more tubes. The tube(s) are configured to translate within a frame of the fork assembly between a first, lowered position and a second, elevated position. At least one actuator, such as a hydraulic cylinder or another type of linear actuator, may be coupled between the frame and the tube(s) and may be in fluid communication with a hydraulic system, such as the hydraulic system that is currently used to pivot the lift arm and fork assembly of conventional container handlers. An operator may actuate the at least one actuator from a first position to a second position to cause translation of the tube(s) within the frame of the fork assembly, thus causing movement of the fork tines relative to the frame. These and other aspects of embodiments of the present invention are discussed in more detail below.

Some embodiments of the present invention are particularly suitable for use with certain vehicles, such as loaded container handlers and waste collection and transportation vehicles. However, those of skill in the art will understand that the present invention is not so limited. In fact, it is contemplated that the present invention be used with any appropriate vehicle. Also, embodiments are contemplated for use with container handlers mounted on trailers or non-moving structures, such as loading docks or stationary platforms. Likewise, embodiments of the present invention may be used both with loaded container handlers and standard, or "yard only," container handlers. Additionally, it is contemplated that the present invention be used with any type of waste container, including both front-end load and rear-end load containers.

Figure 2:
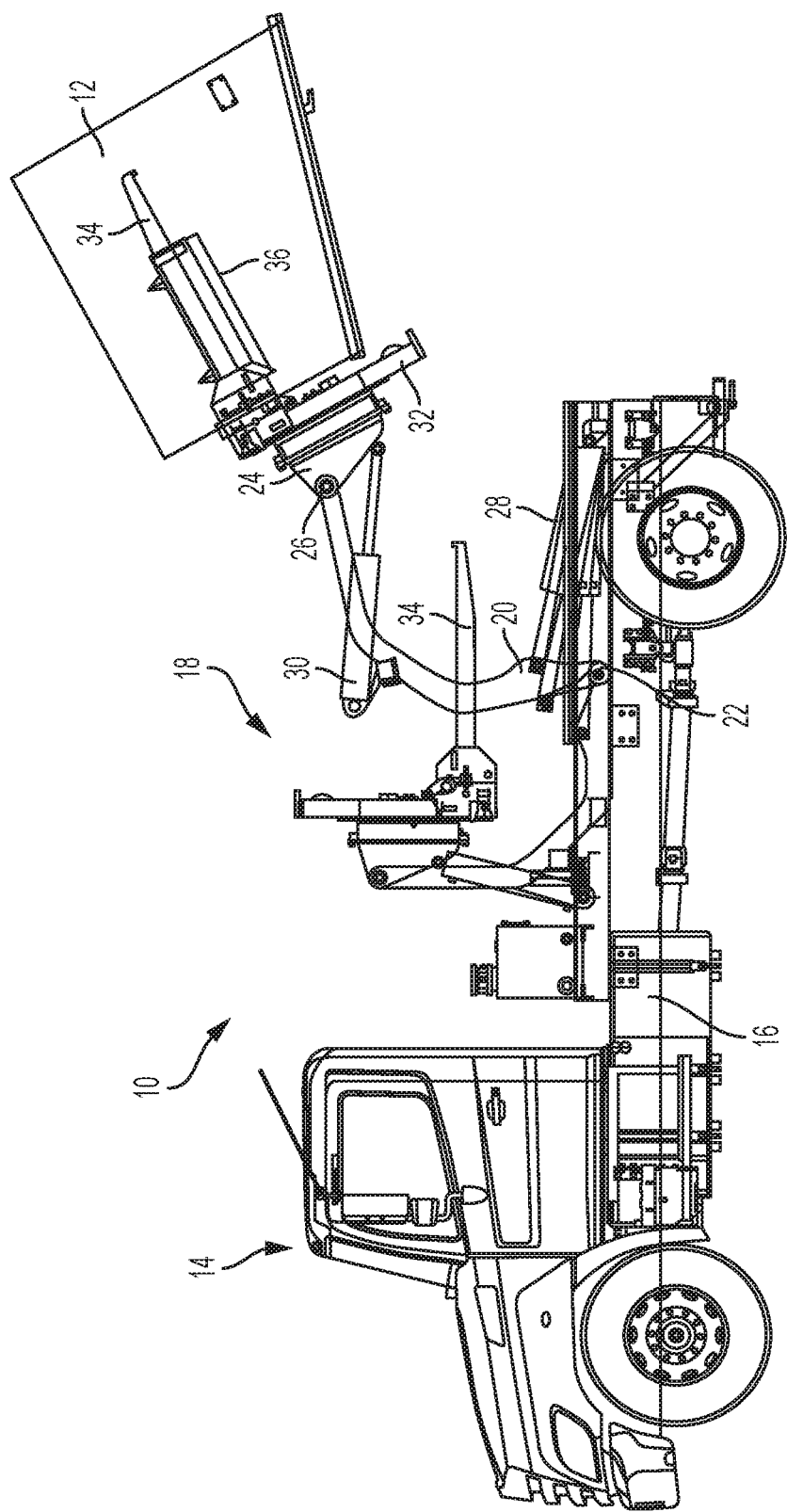
FIG. 2 is a schematic elevation of the vehicle of FIG. 1 illustrating dumping of a container.

Referring now to FIGS. 1 and 2, schematically illustrated is a vehicle 10 with which one embodiment of the present invention may be used. As shown, vehicle 10 is a loaded container handler for transporting and dumping a container 12 and for loading and unloading container 12 from vehicle 10. In one embodiment, vehicle 10 may be similar to the loaded container handlers offered by Galbreath LLC of Winamac, Ind. In general, vehicle 10 comprises a cab 14, a vehicle body, or chassis, 16, and a hoist apparatus 18. Hoist apparatus 18 generally comprises a lift arm 20 pivotally connected to chassis 16 via a pivotal mount 22 and pivotally connected to a mast 24 via a pivotal mount 26. In FIG. 1, hoist apparatus 18 is illustrated traveling through a range of motion from a first, stowed position A to a second, fully extended position B, wherein hoist apparatus 18 is in engagement with container 12.

In particular, hoist apparatus 18 comprises two linear actuators 28, 30, which may be fluid-actuated lift cylinders (e.g., rod-type hydraulic cylinders) in some embodiments. Linear actuator 28 is pivotally connected between lift arm 20 and chassis 16 (or, in some embodiments, with a sub-frame mounted on chassis 16). When actuated, lift mechanism 28 causes lift arm 20 to move from a stowed position above chassis 16 to an extended position behind vehicle 10. This range of motion typically corresponds to a "lift" function performed by an operator of vehicle 10. Linear actuator 30 is pivotally connected between lift arm 20 and mast 24. As shown, a fork assembly in this embodiment comprises a frame 32 coupled with mast 24. When actuated, linear actuator 30 causes mast 24 and thus, frame 32, to pivot about pivotal mount 26. This range of motion may correspond to a "tilt" function performed by an operator of vehicle 10. Further, as shown in FIG. 2, in some embodiments, frame 32 may be rotatable with respect to mast 24 to facilitate dumping of container 12. In some other embodiments, hoist apparatus 18 may comprise additional linear actuators 28 and/or 30 to enhance stability and strength.

As described in greater detail below, frame 32 of the fork assembly preferably comprises a pair of tines 34 that can be used to engage one or more pockets 36 of container 12 or another handling structure. In accordance with certain embodiments of the present invention, tines 34 are preferably operative to translate at least between a first, lowered position with respect to frame 32 (and, correspondingly, with respect to mast 24) and a second, elevated position with respect to the frame 32 and mast 24. In embodiments, an operator may effect the translation of tines 34 via one or more actuators in communication, for example, with a hydraulic system of vehicle 10. The adjustability of tines 34 enables hoist mechanism 18 to engage with, load, unload, dump, and transport various types of containers 12 that may have pockets 36 (or another handling structure) at different heights on container 12 or with different orientations.

Figure 3:
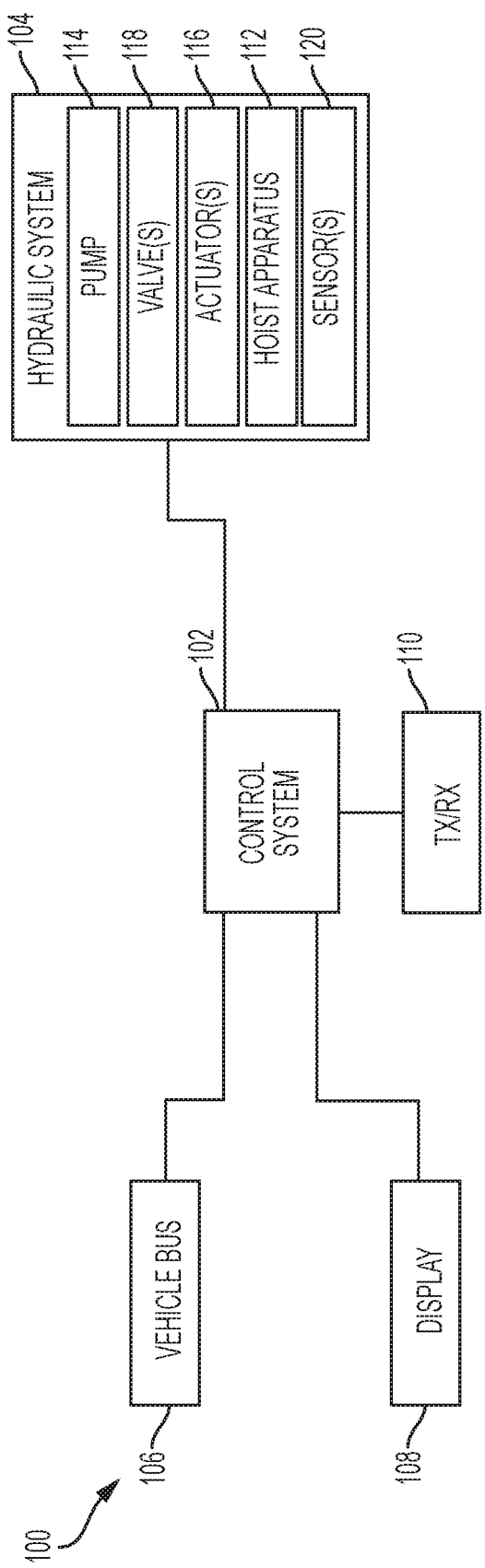
FIG. 3 is a block diagram of a system for operating a container handler mounted on a vehicle with which embodiments of the present invention may be used.

FIG. 3 is a block diagram of a system 100 for operating a container handler mounted on a vehicle with which embodiments of the present invention may be used. For example, system 100 may be used with vehicle 10 described above. In general, system 100 comprises a control system 102 that interfaces with various vehicle components. For example, control system 102 may be in operative electronic communication with a hydraulic system 104, a vehicle bus 106, and a display device 108. In some embodiments, system 100 may also comprise a transceiver 110 to facilitate remote, wireless operation of the vehicle hoist apparatus, for example as described in U.S. Pre-Grant Pub. No. 2016/0347228 to Franiak et al.

Control system 102 may be any suitable electronics with associated memory and software programs running thereon whether referred to as a processor, microprocessor, controller, control module, microcontroller, or the like. In one embodiment, control system 102 may be comparable to the mobile automation control modules for hydraulic systems offered by Flodraulic Group, Inc. of Greenfield, Ind. under the trademark CANTROL™. Control system 102 preferably comprises the hardware and software necessary to operate various aspects of system 100.

The memory of control system 102 may be any suitable memory or computer-readable medium as long as it is capable of being accessed by the control system, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of suitable nonvolatile memories, such as secure digital (SD), flash memory, memory stick, or any other medium that may be used to carry or store computer program code in the form of computer-executable programs, instructions, or data. Control system 102 may also include a portion of memory accessible only to control system 102.

Hydraulic system 104 preferably comprises components used to actuate and control a hoist apparatus 112, such as the hoist apparatus 18 described above. In this regard, hydraulic system 104 may comprise a flow path along which a pump 114 (e.g., a hydraulic gear pump coupled with a shaft turned by the vehicle's engine) may pump hydraulic fluid to and from one or more actuators 116, as is well known. One or more valves 118 are preferably located along the flow path between the pump 114 and the actuator(s) 116. In particular, valves 118 may be proportional valves located in a valve group coupled with the vehicle's chassis, and each valve 118 may comprise one or more spools, the movement of which controls the flow of a hydraulic fluid, such as oil, through valves 118. Valves 118 may be analogous to those present in air-over-hydraulic systems, or valves 118 may be actuated electrically, such as by a proportional electrical actuator. For example, the proportional electrical actuator may comprise a solenoid.

Hydraulic system 104 may further comprise one or more sensors 120 in operative electronic communication with control system 102. In this regard, sensors 120 may be position sensors operative to transmit to control system 102 information representative of the extension or retraction of actuators 116 or the movement of a component of hoist apparatus 112. In addition or in the alternative, sensors 120 may be pressure sensors that transmit to control system 102 information representative of the pressure of hydraulic fluid in actuator(s) 116. Those of skill in the art are familiar with suitable sensors 120 for this purpose. Additional information regarding hydraulic systems and circuits for hoist apparatuses is provided in U.S. Pat. No. 8,297,904 to Schroeder; U.S. Pat. No. 6,648,576 to Duell et al.; U.S. Pat. No. 5,806,911 to Haddad, Jr.; and U.S. Pat. No. 5,088,875 to Galbreath et al. and in U.S. Pre-Grant Pub. Nos. 2009/0025378 to Laumer et al. and 2006/0285952 to Galbreath et al., the entire disclosure of each of which is incorporated by reference herein for all purposes.

Those of skill in the art are familiar with communications between electronic modules internal to vehicles, such as an engine control unit, transmission control unit, and the like. In this regard, vehicle bus 106 may comprise a communications network internal to the vehicle with which control system 102 is associated for the speedy and reliable exchange of data between vehicle components. Any suitable communications protocol may be used on bus 106, such as Controller Area Network (CAN) and Local Interconnect Network (LIN), among many others. In a preferred embodiment, the protocol may be the Society of Automotive Engineers (SAE) J1939 protocol used for commercial vehicles. Control system 102 may preferably interface with vehicle bus 106 to receive data from and communicate with the other electronic components or nodes located along vehicle bus 106.

Display device 108 may be any suitable portable computing device known to those of skill in the art for displaying a graphical user interface, such as but not limited to computer monitors, tablet computers, laptops, and cell phones. Display device 108 is preferably in wired or wireless electronic communication with control system 102. In particular, display device 108 may comprise a processor and memory configured to generate a graphical user interface from which an operator of a vehicle may remotely control various aspects of system 100. In one embodiment, an operator may use an input device associated with display device 108 to send commands to control system 102, and in another embodiment, display device 108 may comprise a touchscreen. In any event, an operator may preferably use display device 108 to operate hoist apparatus 112 as described herein.

Those of skill in the art are familiar with prior art container handlers with which embodiments of the present invention may be used. Additional information regarding the details and operation of various container handlers is disclosed in U.S. Pat. No. 9,545,868 to Downing; U.S. Pat. No. 9,004,842 to Downing et al.; and U.S. Pre-Grant Pub. No. 2016/0347228 to Franiak et al., the disclosure of each of which is incorporated by reference herein in its entirety for all purposes.

Figure 4:
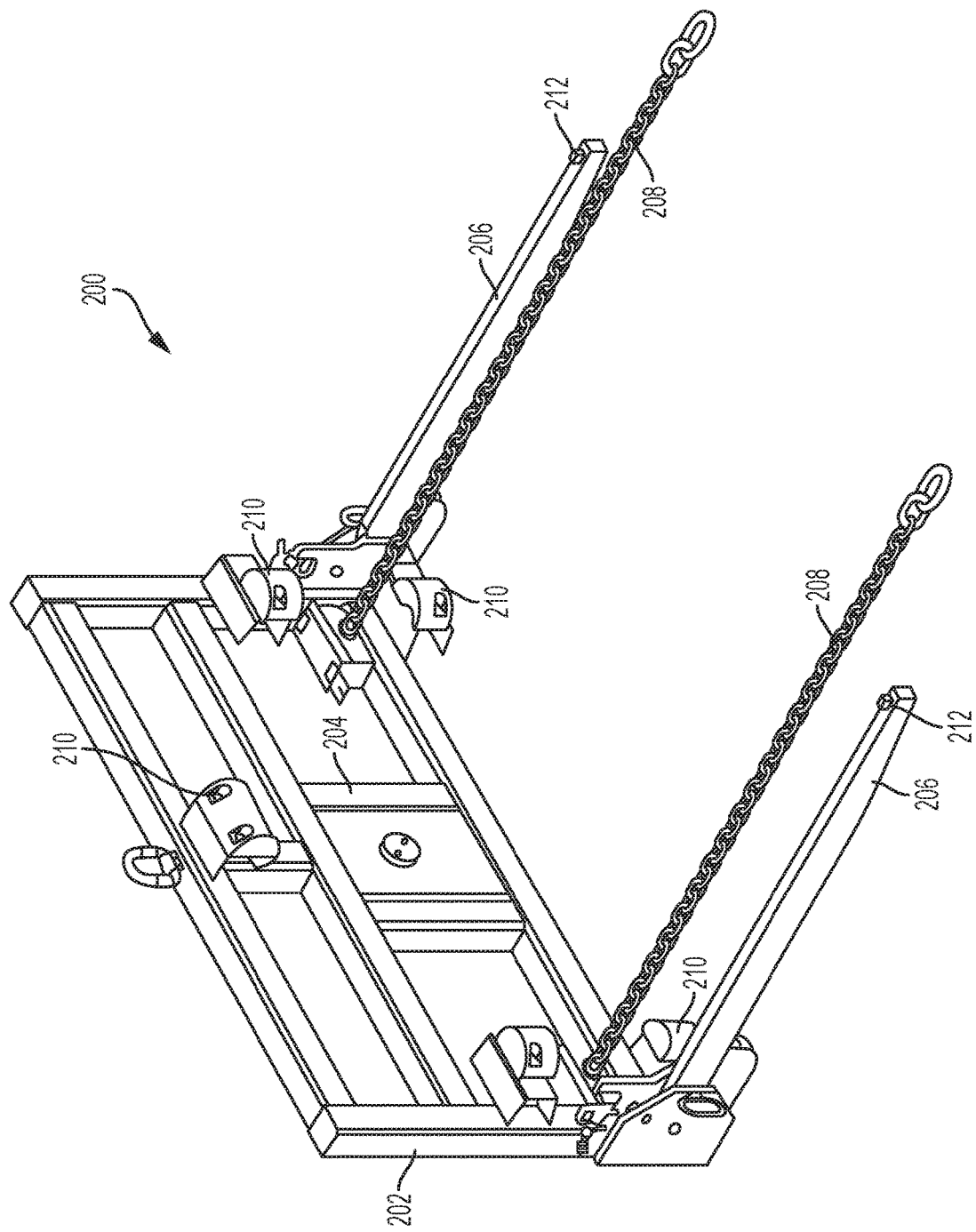
FIG. 4 is a perspective view of a fork assembly used on prior art container handlers.

FIG. 4 is a perspective view of a fork assembly 200 used on prior art container handlers. As described above, fork assembly 200 may be pivotably coupled with a lift arm of a hoist apparatus. Fork assembly 200 includes a rectangular frame 202 to which are mounted a fork assembly mount 204, opposing fork tines 206, container retaining chains 208, and bumpers 210. Although not shown in FIG. 4, fork assembly 200 may include a mast coupled with frame 202 via fork assembly mount 204. Assembly mount 204 may include a collar (not shown) or any similar appropriate mechanism for connection with an output shaft of a rotating mechanism provided on the mast, for example as described in the '868 Patent to Downing. Rotation of the output shaft rotates frame 202 between a substantially zero-degree resting, transport, and loading position and a substantially non-zero-degree dumping position similar to that shown in FIG. 2. In some implementations, frame 202 may be rotated relative to the mast at least 180 degrees in one direction, for example to turn a container held thereby completely upside down to dump the contents of such container.

As shown in FIG. 4, fork tines 206 are fixed to frame 202 at opposing sides thereof and at a distance apart that enables them to be moved along opposing sides of and to engage with complementary structure on a target container, such as fork pockets, trunnion bars, or the like. Hook points 212 may be provided at the outboard end of fork tines 206 to help fork tines 206 remain engaged with respective fork pockets or other complementary structure. One or more chains 208 are provided as a safety measure. In this regard, chains 208 are connected to fork assembly 200 and extend rearwardly for connection to the outboard end of one or more of the fork tines 206. In use, once a container is held by fork assembly 200, with fork tines 206 extending through container fork pockets, the outer ends of the chains are connected with the outboard ends of the fork tines 206 that extend through the ends of the container fork pockets to further protect against the container undesirably sliding off the fork tines 206. Bumpers 210 cushion the container as it is held by the container handler with which fork assembly 200 is used.

As noted above, however, because the position of fork tines 206 cannot be adjusted on frame 202, it is not possible for a container handler employing fork assembly 200 to engage with all desired containers. Again, the position and/or orientation of pockets or other complementary structure for engagement with fork assembly 200 may vary from container to container. Even where the fork assembly 200 is able to engage a particular container, depending on the position and/or orientation of the fork pockets or other complementary structure on the container and on the container size and shape, the container may nonetheless not be able to be safely loaded and transported on a vehicle.

Trailers that comprise fork tines for engaging certain front load containers are known. The fork tines are releasably coupled with a frame that is tiltable about an axis perpendicular to the fork tines. When the tines are in engagement with a container, a linear actuator coupled with the trailer and the frame may be actuated to pivot the frame, thereby lifting the container off of the ground for transport. In these trailers, the frame defines a plurality of apertures at which the fork tines may be secured. For instance, the apertures may be spaced in 2¾" increments, and the fork tines may be manually moved upward or downward to a new location on the frame, then secured into position. Examples of such trailers are the RFL-5000 Front Load Container Trailer offered by the Chagnon division of Durabac Inc., of Quebec, Canada, and the Pro-Delivery Front Load Dumpster Trailer offered by Pro-Trainer, Inc. of Alexandria, Minn. Those of skill in the art will appreciate, however, that this is a cumbersome, and time-consuming process. Notably, these trailers are not suited for efficiently handling a variety of containers during a single operating session, as the fork tines could require manual repositioning each time a different container was encountered.

According to embodiments of the present invention, however, positions of the tines of a fork assembly may be automatically adjusted. For instance, one or more actuators may be operative to move a carriage from which the tines extend vertically along a fork assembly frame. As discussed in greater detail below, embodiments of the present invention enable a container handler to quickly and efficiently engage with many different types of front-end and rear-end load containers, even where the fork pockets (or other complementary structure(s)) differ in position and/or orientation on each container.

Figure 5:
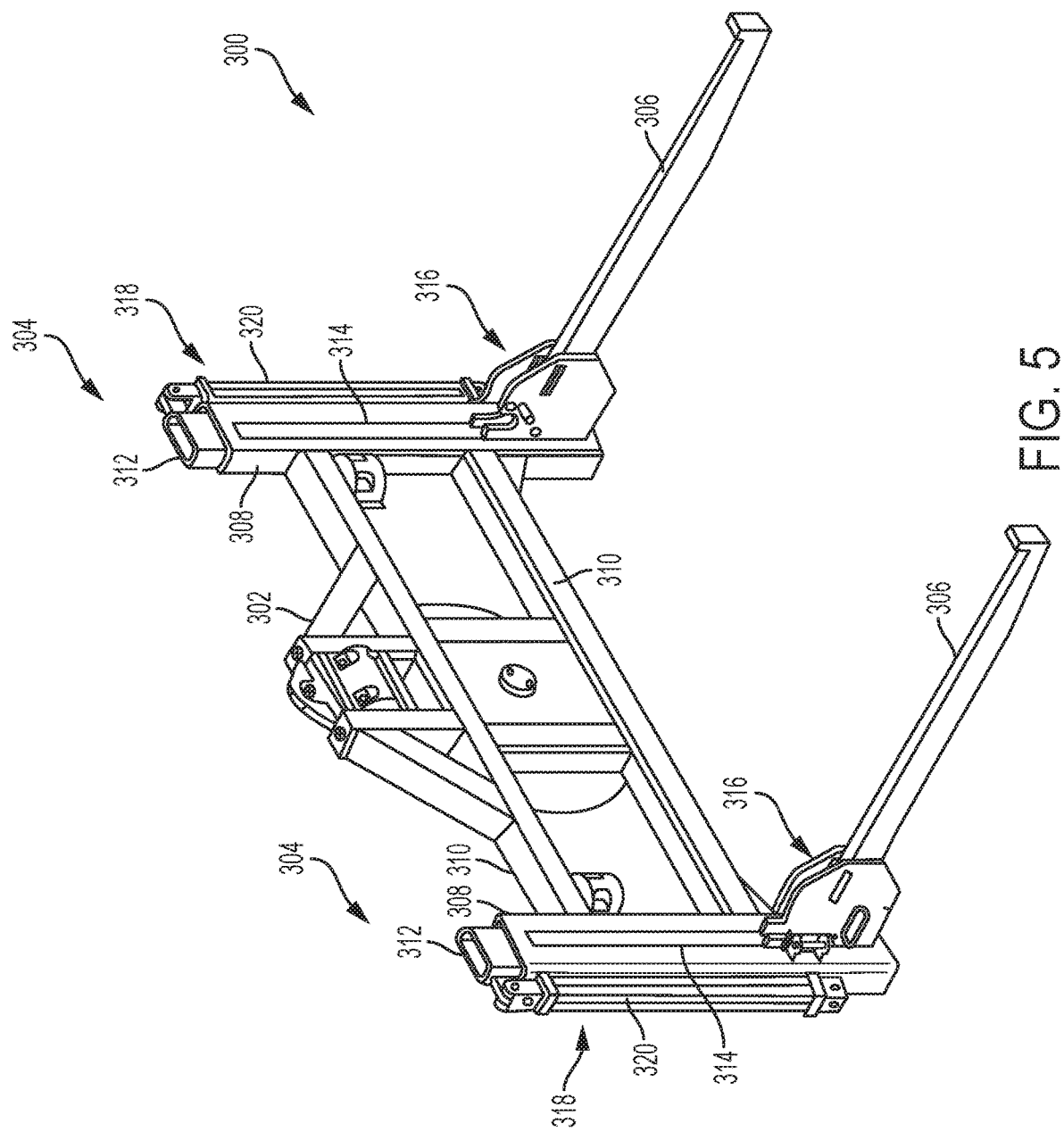
FIG. 5 is a perspective view of a fork assembly in accordance with an embodiment of the present invention, wherein a carriage of the fork assembly is in a retracted position.
Figure 6:
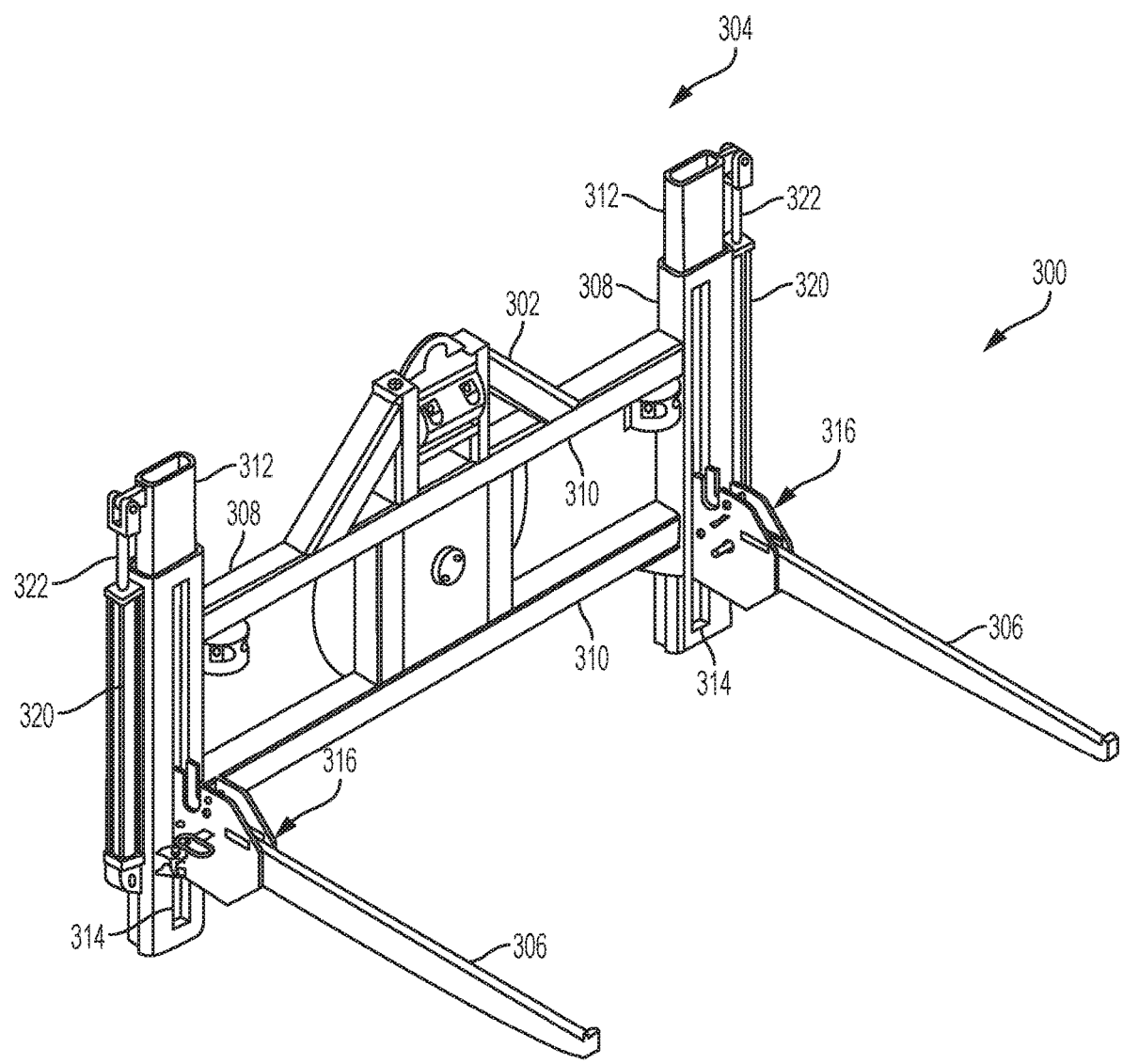
FIG. 6 is a perspective view of the fork assembly of FIG. 5, wherein the carriage is in a partially extended position.
Figure 7:
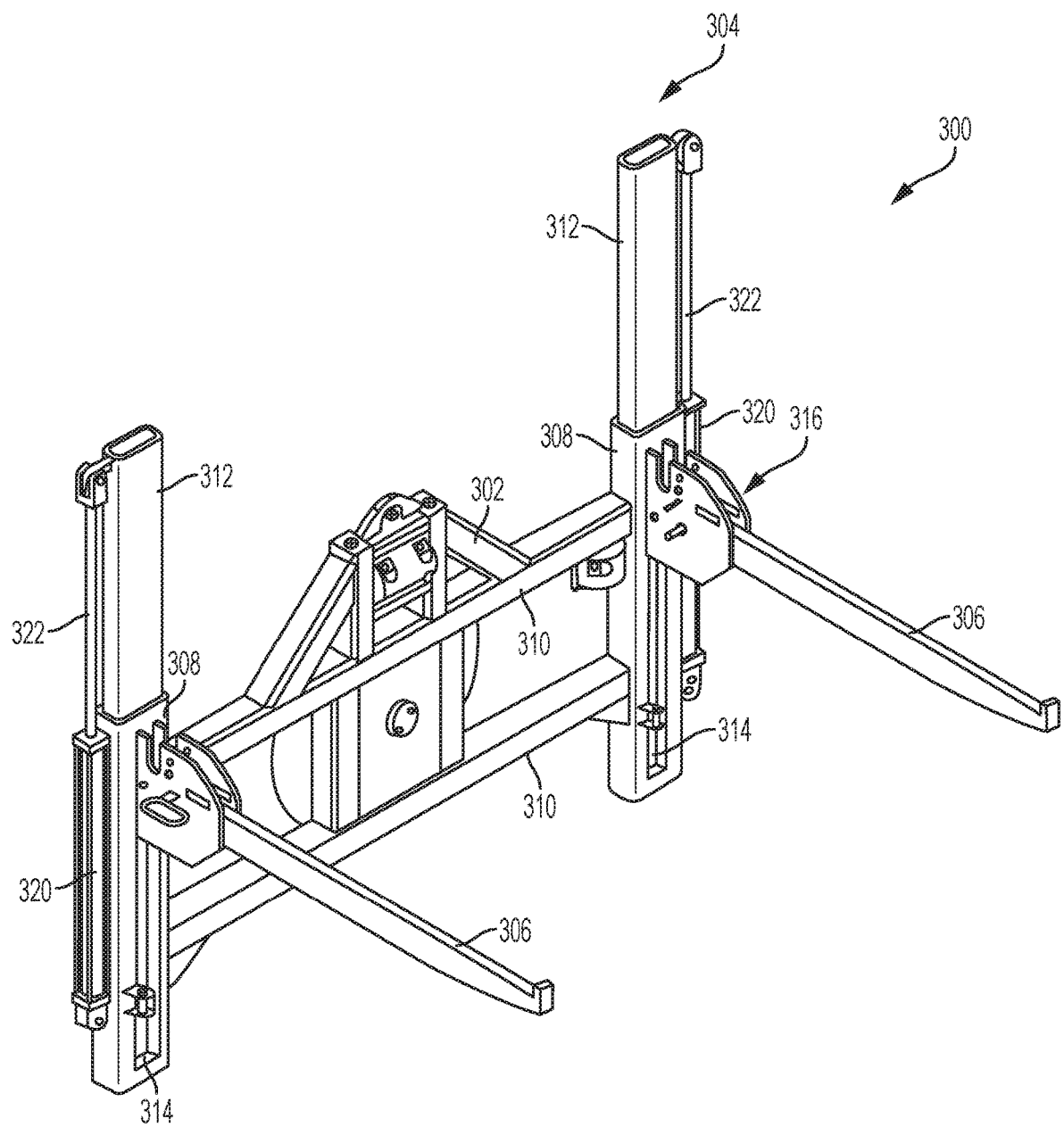
FIG. 7 is a perspective view of the fork assembly of FIG. 5, wherein the carriage is in a fully extended position.

FIGS. 5-7 are perspective views of a fork assembly 300 in accordance with an embodiment of the present invention. In general, fork assembly 300 may comprise a frame 302 and a carriage 304. A pair of fork tines 306 are carried by carriage 304, and tines 306 may extend generally orthogonally to frame 302 and carriage 304.

As shown, frame 302 may comprise spaced apart sleeves or tubes 308 between which one or more cross members 310 extend. In this embodiment, tubes 308 may be rectangular in cross-section, though that is not required in all embodiments. Also in this embodiment, carriage 304 may comprise a pair of tubes 312 coupled with frame 302. In particular, tubes 308 are at least partially hollow and are dimensioned to receive tubes 312 slidably therein. Thus, the exterior dimensions of tubes 312 may be complementary to the interior dimensions of tubes 308, except slightly smaller, so that tubes 312 may reciprocate within tubes 308 in this embodiment. Tubes 312 may also be rectangular in cross section in this embodiment and may also be hollow in some embodiments, though again this is not required.

Tubes 308 of frame 302 preferably also each define a longitudinal slot or opening 314. Slots 314 may extend vertically along one side of tubes 308 from a position proximate the bottom ends thereof to a position proximate the top ends thereof. As shown in FIGS. 5-7, tines 306 are preferably coupled with tubes 312 of carriage 304 through slots 314 via a suitable mounting structure, such as flanges 316. In some embodiments, tines 306 may be pivotable within flanges 316 such that tines 306 may be manually pivoted from the orthogonal position shown in the figures to a position in which the longitudinal axes of tines 306 are substantially parallel with the longitudinal axes of tubes 308. This may be desirable for storage or when fork assembly 300 is not in use.

Fork assembly 300 is preferably configured to operate as a component of a container handler, such as the container handlers described above. Thus, for example, fork assembly 300 may be operative to be pivotably coupled with a lift arm of a hoist apparatus in one embodiment. In some embodiments, fork assembly 300 may also comprise a mast to which frame 302 may be rotatably coupled.

In this embodiment, an actuator 318 is coupled between each tube 308 of frame 302 and each tube 312 of carriage 304. For instance, actuators 318 may be rod-type linear actuators in this embodiment operative to move from a first, retracted position to a second, extended position. Further, actuators 318 may be hydraulic actuators in one embodiment, operative for fluid communication with a hydraulic system of a vehicle, for example as described above. Actuators 318 may comprise housings 320 mounted on a side of tubes 308 via suitable fasteners, and actuators 318 may further comprise longitudinal rods 322 mounted on a corresponding side of tubes 312 via suitable fasteners. In response to the flow of hydraulic fluid, rods 322 of actuators 318 may move from a retracted position to an extended position. Extension of rods 322 causes tubes 312 to translate within tubes 308 and, correspondingly, tines 306 to move upward along slots 314. Thus, carriage 304 may move parallel to frame 302, thereby adjusting the position of tines 306 on fork assembly 300, in response to actuation of actuators 318.

Reference is made to FIGS. 5-7 for an illustration of the movement of carriage 304 and fork tines 306 of fork assembly 300 relative to frame 302 of fork assembly 300, according to the illustrated embodiment. In FIG. 5, actuators 318 have not been actuated, and carriage 304 remains in a retracted position within frame 302. In FIG. 6, actuators 318 have been actuated such that rods 322 are partially extended, and accordingly carriage 304 is in a partially extended position relative to frame 302. In FIG. 7, rods 322 of actuators 318 are fully extended, and carriage 304 is in a fully extended position relative to frame 302. As shown in the figures, as carriage 304 moves from the retracted position to the extended position, tines 306 translate vertically along slots 314 from the bottom ends to the top ends thereof.

Figure 8:
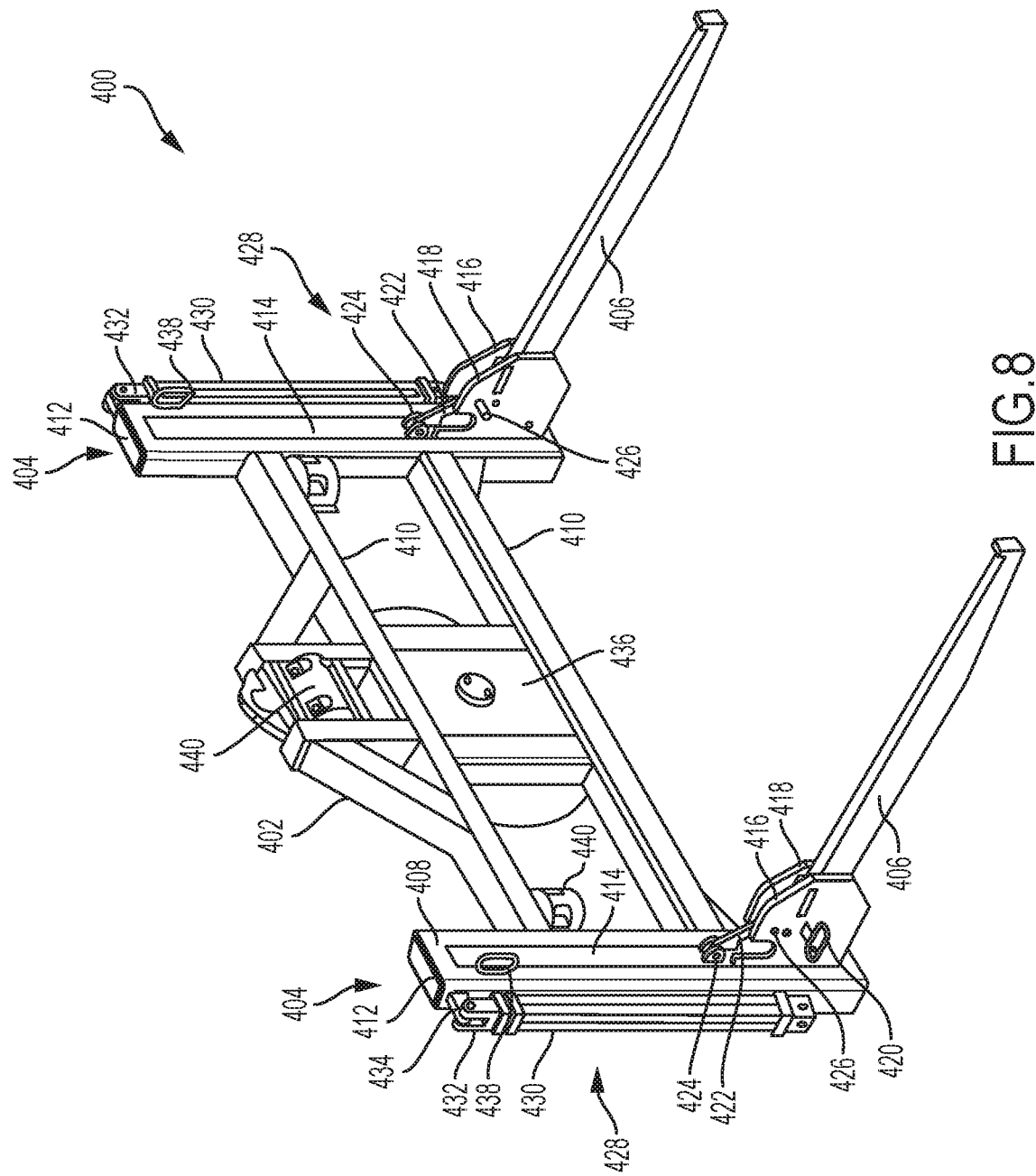
FIG. 8 is a perspective view of a fork assembly in accordance with an embodiment of the present invention.
Figure 9:
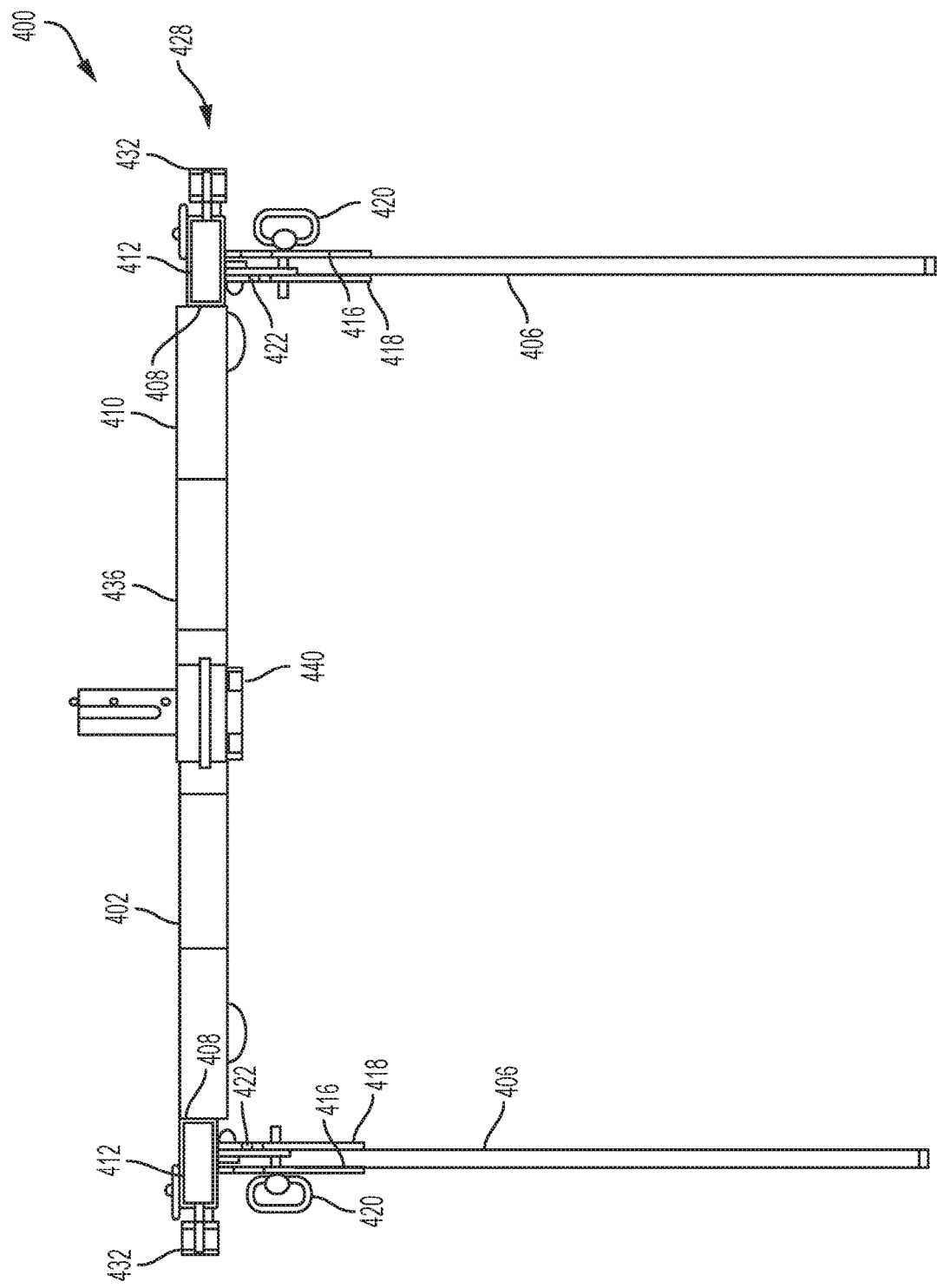
FIG. 9 is a plan view of the fork assembly of FIG. 8.
Figure 10:
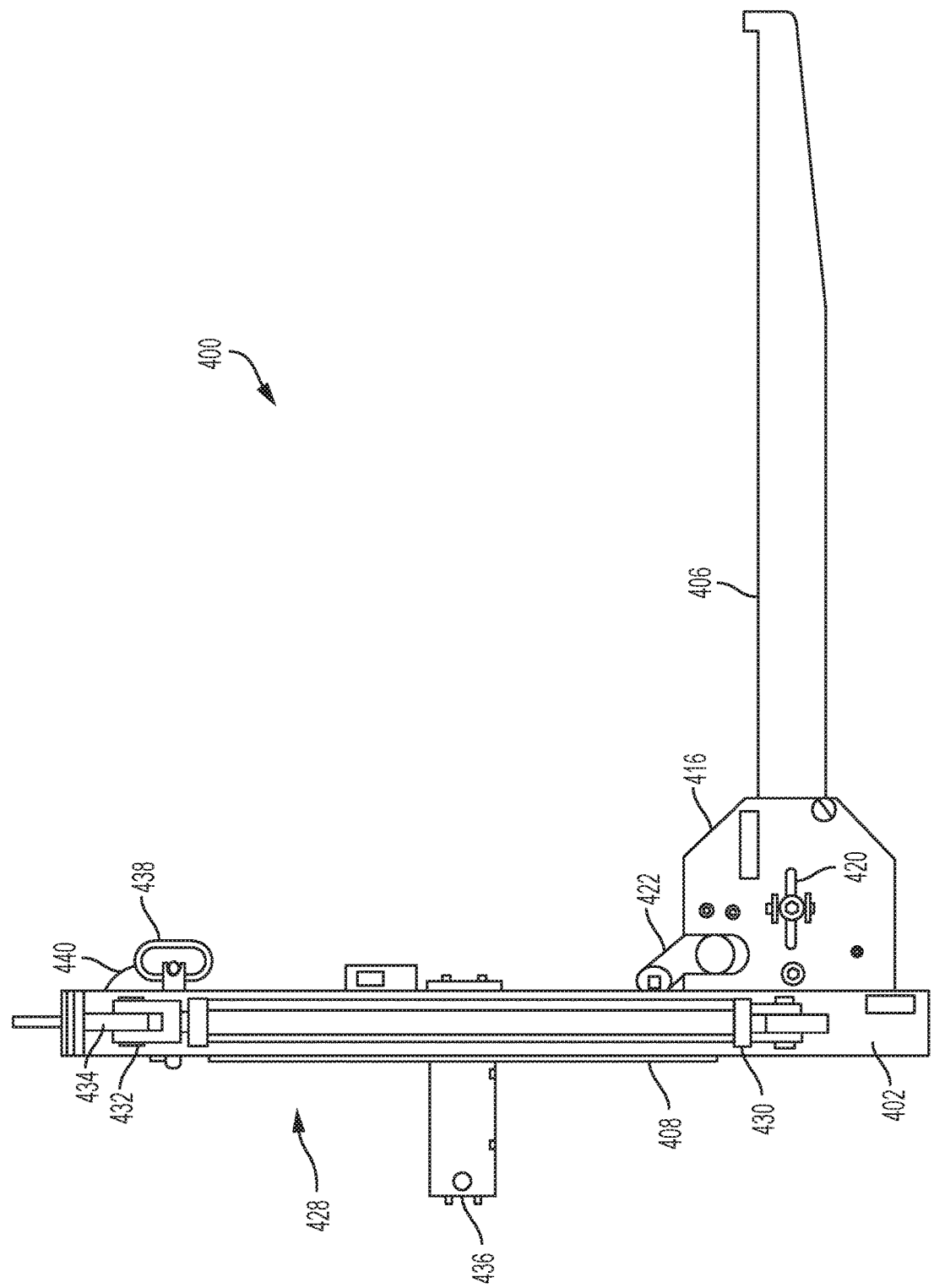
FIG. 10 is a left side view of the fork assembly of FIG. 8.
Figure 11:
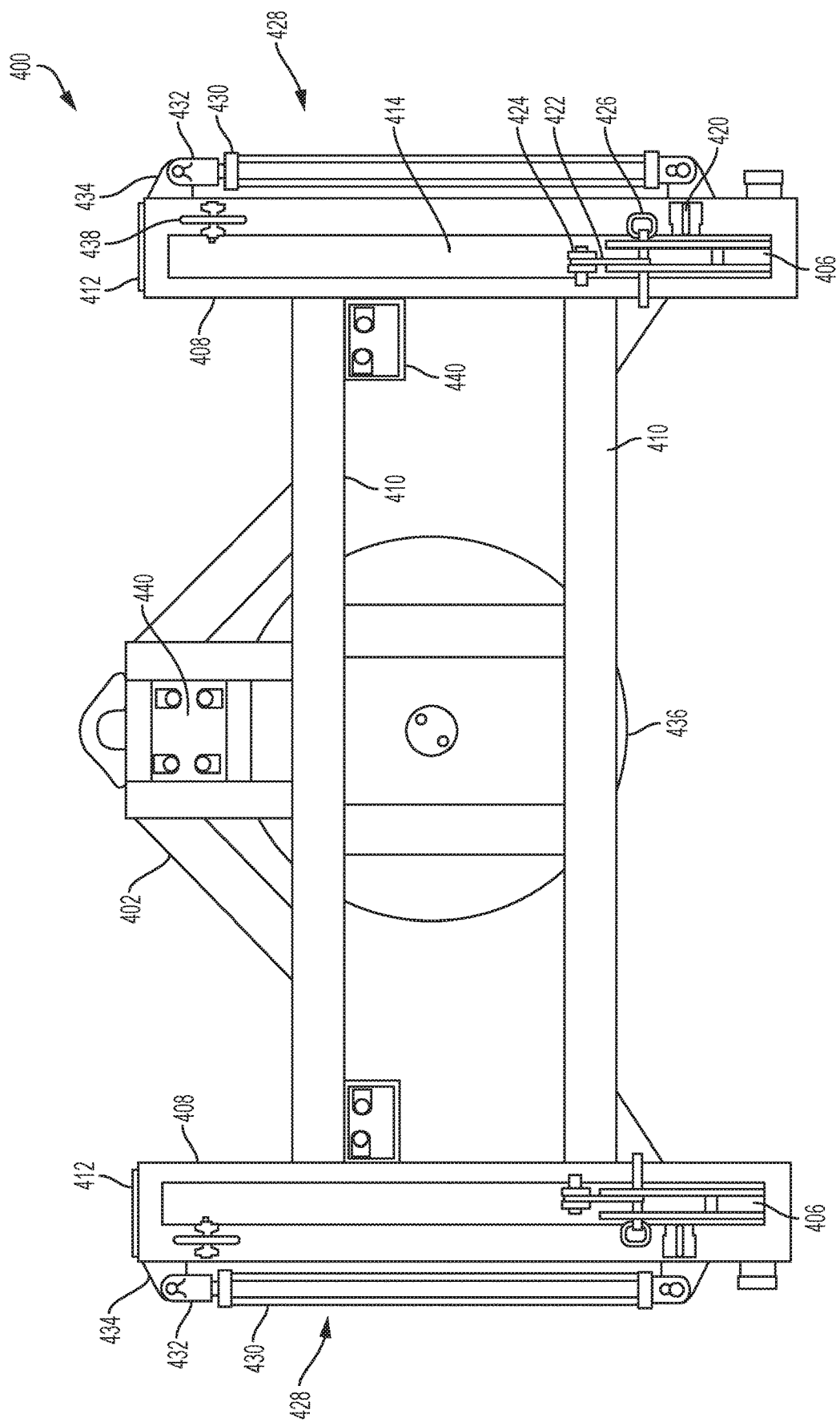
FIG. 11 is a front view of the fork assembly of FIG. 8.

FIGS. 8-11 illustrate a fork assembly 400 according to another embodiment of the present invention. In this regard, FIGS. 8 and 9 provide a perspective view and a plan view, respectively, of fork assembly 400. FIG. 10 is a left side view of fork assembly 400, and FIG. 11 is a front view of fork assembly 400.

Referring to these figures, fork assembly 400 may be similar in some respects to fork assembly 300, described above. In this regard, fork assembly 400 may comprise a frame 402 and a carriage 404. Also, fork tines 406 are coupled with carriage 404 as described in greater detail below. Two such fork tines 406 are provided in this embodiment, though other embodiments may comprise one or a plurality of fork tines 406. Fork assembly 400 is likewise preferably configured to operate on a container handler, such as the container handlers described above. Thus, for example, fork assembly 400 may be pivotably coupled with a lift arm of a hoist apparatus in one embodiment.

As with frame 302 of fork assembly 300, in the illustrated embodiment, frame 402 may comprise spaced apart, hollow tubes 408 that are rectangular in cross-section, between which one or more cross members 410 extend. Again, however, frame 402 need not comprise dual, spaced-apart tubes 408 in all embodiments; any suitable frame may be provided. Likewise, tubes 408 may define any suitable cross section in other embodiments, such as circular, square, or triangular.

Carriage 404 may preferably be configured to translate along a plane substantially parallel with a plane in which frame 402 lies. Thus, the form of carriage 404 may depend on the configuration of frame 402. Because in this embodiment frame 402 comprises tubes 408, carriage 404 in this embodiment may comprise a pair of tubes 412 sized to slide within tubes 408 of frame 402. However, this is not required in all embodiments, and those of skill in the art will appreciate that many different configurations of frame 402 and carriage 404 are within the scope of the present invention. For example, in some embodiments, the frame could comprise a unitary tube, and the carriage could comprise a complementary structure designed to move within or outside of the frame. However, the carriage need not be positioned telescopically within portion(s) of the frame in all embodiments; in some embodiments, the carriage may slide around portions of the frame, or neither component may be positioned within the other. In yet other embodiments, the carriage may simply be juxtaposed to the frame and operative to move parallel thereto in response to actuation of one or more actuators.

Because carriage 404 is configured to extend and retract within a portion of frame 402 this embodiment, tubes 408 of frame 402 each define a longitudinal slot or opening 414. Slots 414 may extend vertically along one side of tubes 408 from a position proximate the bottom ends thereof to a position proximate the top ends thereof. Again, however, this is not required, and slots 414 may differ or not be provided at all in other embodiments. For instance, where the carriage is positioned exterior of the frame, such slots may be unnecessary. In any event, it will be appreciated that the width of slots 414 may depend on the size and shape of the mounting structure for fork tines 406. Likewise, the length of slots 414 will depend on the desired distance of travel for the fork tines 406 with respect to the frame. In one embodiment, fork tines 406 may be configured to travel approximately 30 inches along slots 414.

Like tines 306 above, tines 406 are preferably coupled with tubes 412 of carriage 404 through slots 414. In the illustrated embodiment, each tine 406 may be coupled with a tube 412 via connection between a pair of opposing lateral flanges 416, 418. Tines 406 may be secured between flanges 416, 418 using suitable fasteners. Tines 406 maybe secured in multiple ways with flanges 416, 418 and carriage 404. For instance, tines 406 may be bolted between flanges 416, 418, and/or a removable hitch pin 420 may extend through flanges 416, 418 and through an aligned aperture defined in tines 406. Further, a trunnion latch 422 may extend in an angular fashion between tubes 412 and tines 406. Trunnion latch 422 may be fastened with tubes 412 via a mounting bracket 424, and it may be fastened between flanges 416, 418 via a hitch pin 426.

Also in this embodiment, an actuator 428 is coupled between each tube 408 of frame 402 and each tube 412 of carriage 404. Again, actuators 428 may be rod-type linear actuators in this embodiment operative to move from a first, retracted position to a second, extended position. Actuators 428 may be double-acting hydraulic actuators in one embodiment, operative for fluid communication with a hydraulic system of a vehicle, for example as described above. Those of ordinary skill in the art are familiar with hydraulic circuits and the various hydraulic lines, valves, switches, and other related components that are not shown in FIGS. 8-11. In a preferred embodiment, where multiple actuators 428 are provided, flow control components, including manifolds, valves, flow dividers, and the like familiar to those of skill in the art, are used to actuate actuators 428 so that each actuator 428 extends and retracts the same distance, with the same speed, and at the same time as each other actuator 428. In this regard, the hydraulic circuit in fluid communication with actuators 428 may comprise priority flow control components offered by Parker Hannifin Corp. of Cleveland, Ohio. Additional background regarding a flow divider/combiner hydraulic circuit for maintaining synchronization of hydraulic actuators is provided in U.S. Pat. No. 5,806,911, the entire disclosure of which is incorporated by reference herein for all purposes.

However, linear actuators are not required in all embodiments. Embodiments of the invention contemplate any appropriate actuator for moving carriage 404 relative to frame 402, including, by way of example and not limitation, rack and pinion gear assemblies or rotary actuators. Where linear actuators are provided, they need not be hydraulic or even fluid-actuated in all embodiments; for instance, those of skill in the art can select a suitable electric-powered actuator if needed or desired. Moreover, in some embodiments, only one actuator 428 may be provided, or more than two actuators 428 may be used to adjust carriage 404 and tines 406.

In any event, as shown, actuators 428 may comprise housings 430 mounted on a side of tubes 408 via suitable fasteners, and actuators 428 may further comprise longitudinal rods mounted on a corresponding side of tubes 412 via fasteners coupled between a mounting bracket 432 disposed at a distal end of each rod and a mounting flange 434 disposed at a distal end of each tube 412. (Although not shown in FIGS. 8-11, the longitudinal rods are preferably analogous to those shown in FIGS. 6-7). In some embodiments, actuators 428 may be dual-acting linear actuators.

As noted above in the context of fork assembly 300, fork assembly 400 may include a mast in some embodiments, although the mast is not shown in FIGS. 8-11. Where, for example, fork assembly 400 is intended to be rotatable, frame 402 of fork assembly 400 may be coupled with the mast via a fork assembly mount 436. But, this is not required in all embodiments, and in other cases, frame 402 of fork assembly 400 may be connected directly with a lift arm of a hoist apparatus and pivotable with respect thereto. Further, actuators 428 need not be coupled between tubes 408 and tubes 412 in all embodiments; where a mast is provided, in some embodiments, actuators 428 may be coupled between the mast and the carriage (e.g., tubes 412), rather than between the frame and the carriage. Other configurations are also contemplated.

Further, in some embodiments, a removable hinge pin 438 may extend through each tube 408 into a corresponding aperture defined in each tube 412. Hinge pin 438 may thus be used to releasably couple and/or lock carriage 404 with frame 402 where adjustment of the position of tines 406 is not currently required. Hinge pin 438 may also retain carriage 404 in place relative to frame 402 in the event that actuators 428 are not operative, for example where hydraulic fluid pressure is lost. It will be appreciated that each tube 412 may define a plurality of apertures along its length such that each tube 412 may be fixed in various levels of extension or retraction with respect to frame 402. Finally, bumpers 440, which may be analogous to bumpers 210 described above, may be disposed on frame 402 in some embodiments.

In use, in response to the flow of hydraulic fluid, the rods of actuators 428 may move from a retracted position to an extended position. Extension of these rods causes tubes 412 to move vertically within tubes 408 and, correspondingly, tines 406 to move upward along slots 414. Carriage 404 may move parallel to frame 402, thereby adjusting the position of tines 406 on fork assembly 400, in response to actuation of actuators 428. Those of ordinary skill in the art can select suitable actuators 428 having a stroke length that will provide the desired travel of tines and which are rated for the loads that will be applied during operation of fork assembly 400. Accordingly, an operator of a container handler comprising fork assembly 400 may automatically adjust the position of fork tines 406 vertically with respect to frame 402. In some embodiments, the operator may control the various components of the container handler, including actuators 428, in any of the methods described in the above-incorporated U.S. Pre-Grant Pub. No. 2016/0347228. As described above, doing so will enable the operator to adjust the container handler to safely handle multiple different types of containers, even where fork pocket locations or orientations vary on each container.

Figure 12:
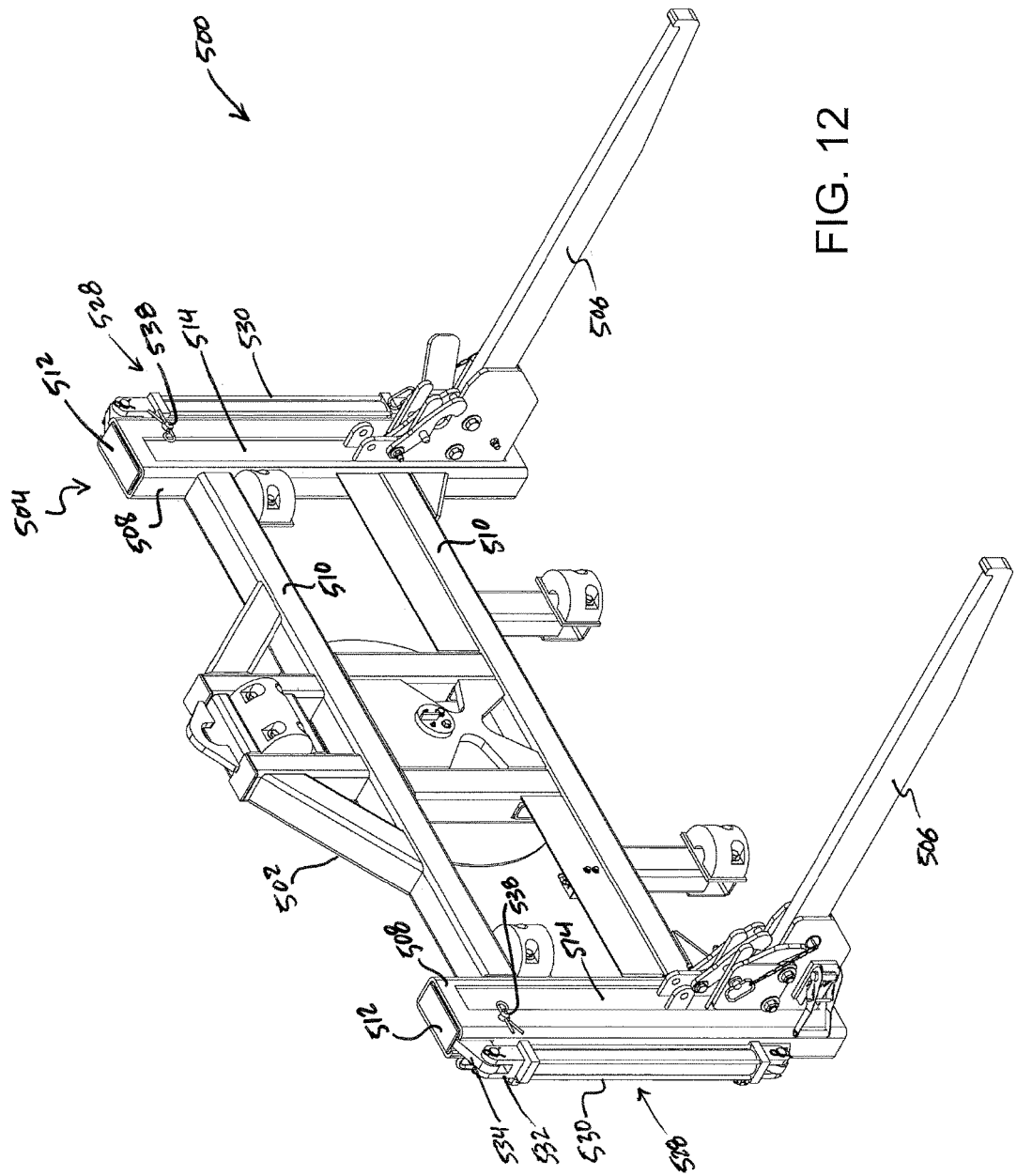
FIG. 12 is a perspective view of a fork assembly in accordance with another embodiment of the present invention.
Figure 13:
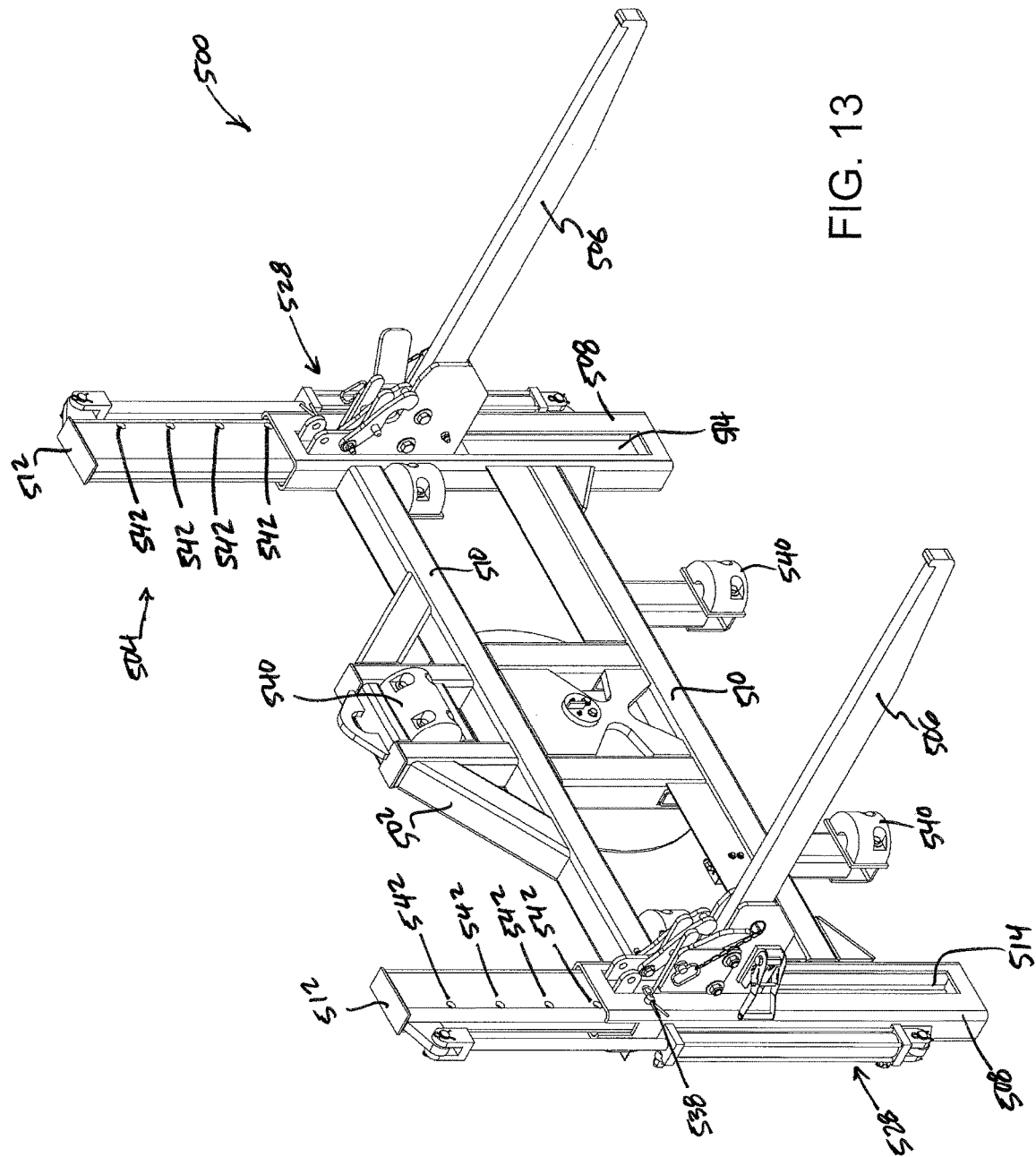
FIG. 13 is a perspective view of the fork assembly of FIG. 12, wherein a carriage of the fork assembly is in a fully extended position.
Figure 14:
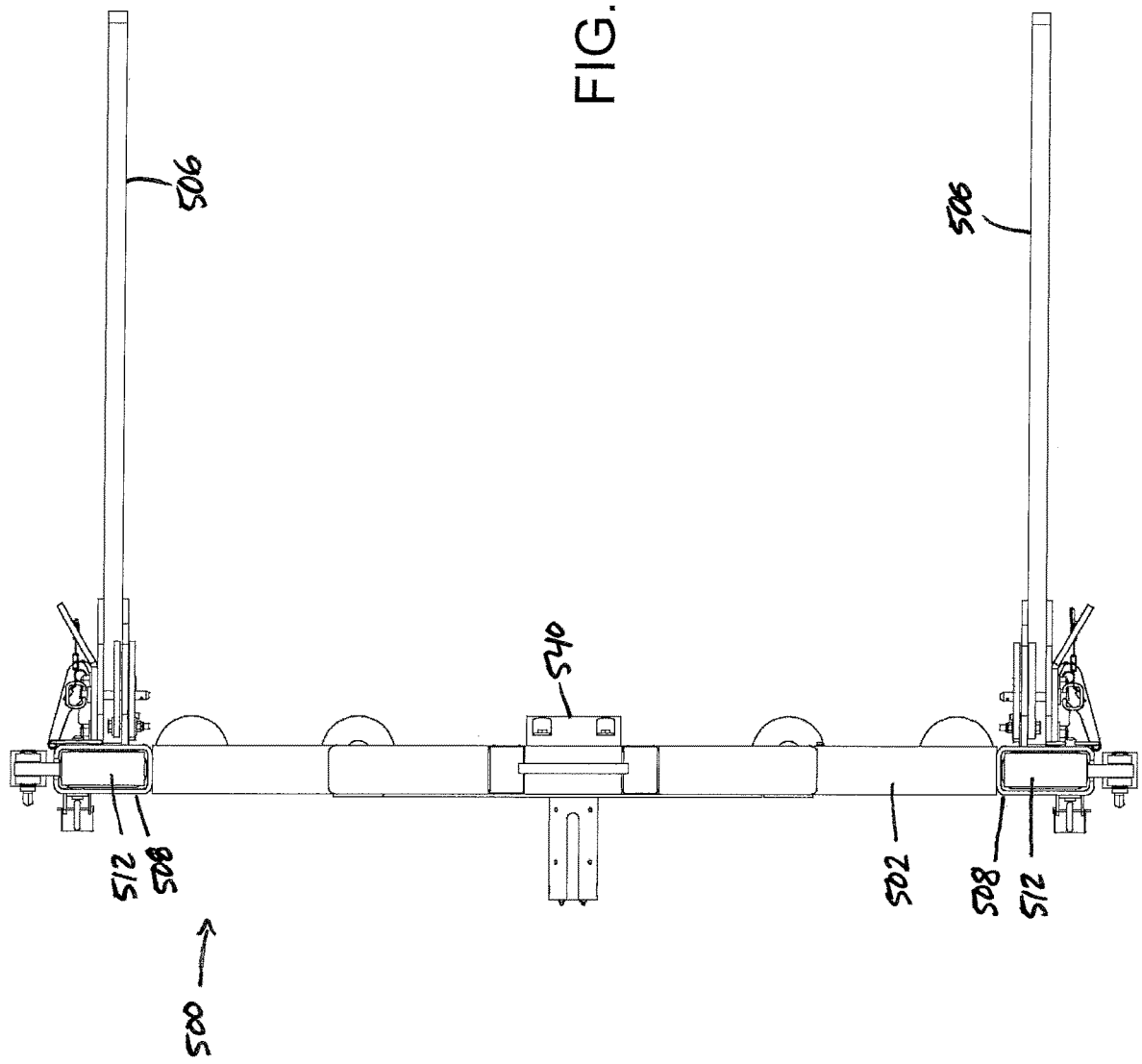
FIG. 14 is a plan view of the fork assembly of FIG. 12.
Figure 15:
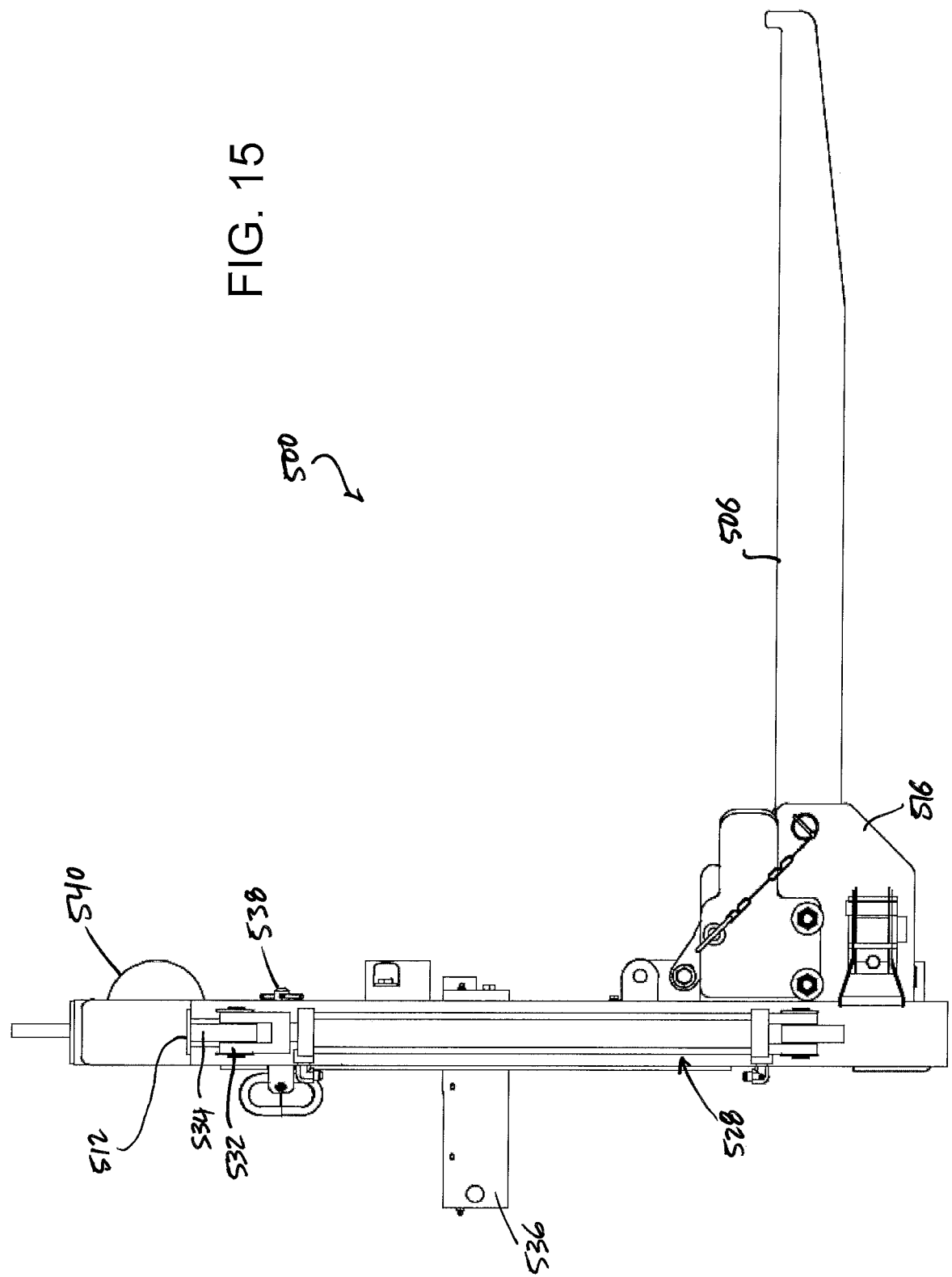
FIG. 15 is a left side view of the fork assembly of FIG. 12.
Figure 16:
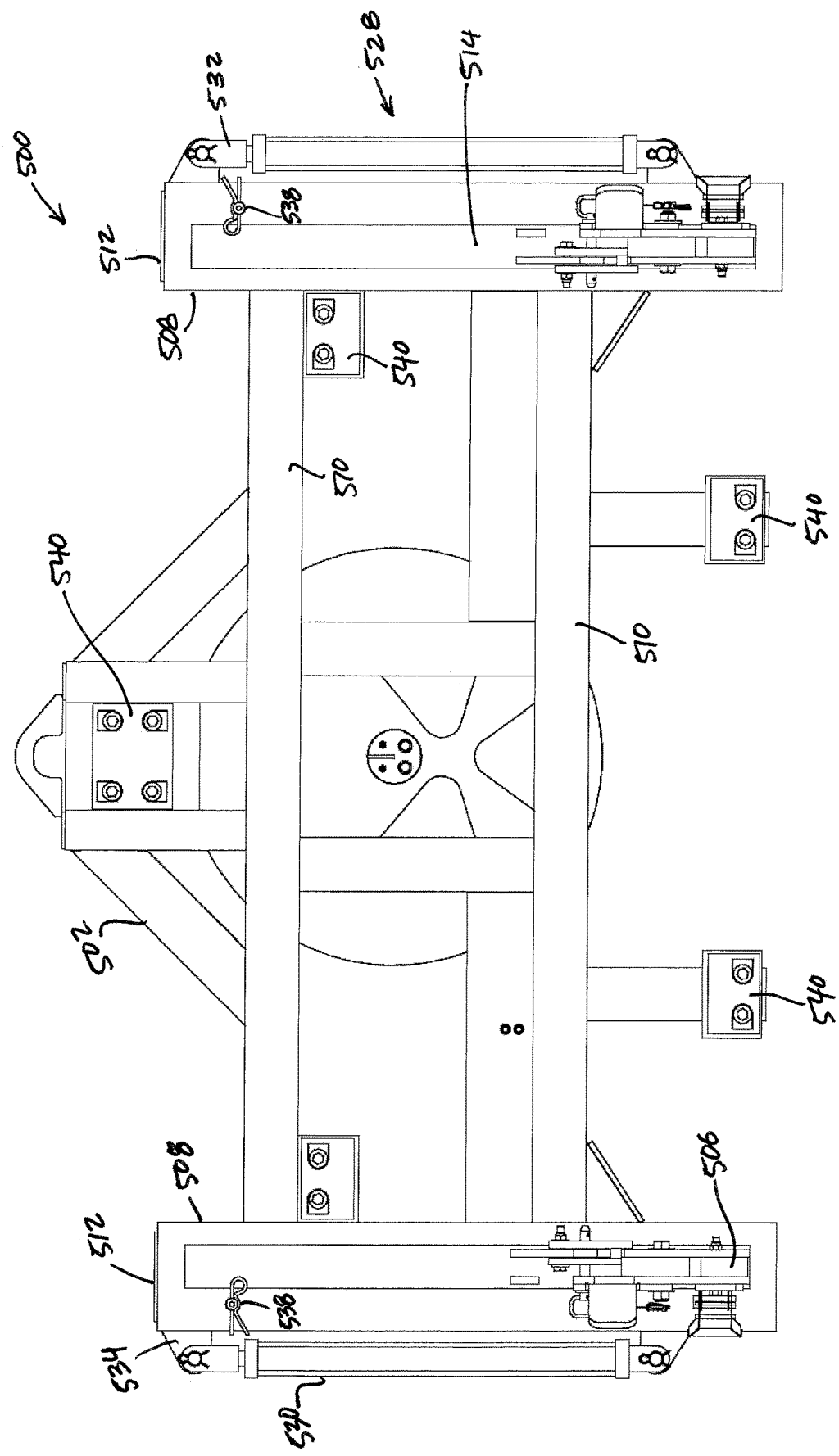
FIG. 16 is a front view of the fork assembly of FIG. 12.

FIGS. 12-16 illustrate a fork assembly 500 according to another embodiment of the present invention. In this regard, FIGS. 12 and 13 are perspective views of fork assembly 500. FIG. 14 is a plan view of fork assembly 500, FIG. 15 is a left side view of fork assembly 500, and FIG. 16 is a front view of fork assembly 600.

Referring to these figures, fork assembly 500 may be similar in some respects to fork assemblies 300 and 400, described above. In this regard, components of fork assembly 500 analogous to those described above with reference to FIGS. 8-11 are indicated with a similar reference numeral that has been incremented by 100. Fork assembly 500 is likewise preferably configured to operate on a container handler, such as the container handlers described above. Thus, for example, fork assembly 500 may be pivotably coupled with a lift arm of a hoist apparatus in one embodiment.

As best seen in FIGS. 12-13, a removable hinge pin 538 may extend through each tube 508 into a corresponding one of a plurality of apertures 542 defined in each tube 512. Hinge pin 538 may thus be used to releasably couple and/or lock carriage 504 with frame 502 if adjustment of the position of tines 506 is not currently required. Hinge pin 538 may also retain carriage 504 in place relative to frame 502 in the event that actuators 528 are not operative, for example where hydraulic fluid pressure is lost. It will be appreciated that each tube 512 may define a plurality of apertures along its length such that each tube 512 may be fixed in various levels of extension or retraction with respect to frame 502.

Based on the above, it will be appreciated that embodiments of the invention provide a unique system for automatic adjustment of tines on a fork assembly associated with a container handler. While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A vehicle, comprising:
   a chassis;
   a hoist apparatus pivotably coupled with the chassis, the hoist apparatus movable between a stowed position and an extended position with respect to the chassis;
   the hoist apparatus further comprising a pivotable fork assembly, the fork assembly comprising a frame and a carriage movably coupled with the frame;
   wherein the frame comprises at least one first tube having a hollow portion defined therein, the at least one first tube having a first longitudinal axis;
   wherein the carriage comprises at least one second tube slidably received in the hollow portion of the at least one first tube, the at least one second tube having a second longitudinal axis that is coaxial with the first longitudinal axis;
   one or more tines coupled with the carriage; and
   at least one actuator coupled between the frame and the carriage, the at least one actuator operative to move between a first position and a second position;
   wherein movement of the at least one actuator from the first position toward the second position causes the carriage to move substantially parallel to the frame;
   wherein the frame defines at least one slot through which the one or more tines extend.

2. The vehicle of claim 1, wherein the hoist apparatus comprises at least one lift arm pivotably coupled with the vehicle chassis.

3. The vehicle of claim 2, wherein the fork assembly comprises a mast coupled with the frame.

4. The vehicle of claim 3, wherein the frame is rotatable with respect to the mast.

5. The vehicle of claim 1, wherein the carriage comprises two tubes.

6. The vehicle of claim 1, wherein the at least one actuator is a linear actuator.

7. The vehicle of claim 6, wherein the at least one actuator comprises a rod-type hydraulic cylinder in fluid communication with a hydraulic system of the vehicle.

8. A container handler, comprising:
   a first frame;
   at least one lift arm coupled with the first frame;
   at least one first actuator operative to move the at least one lift arm with respect to the first frame;
   a fork assembly coupled with the at least one lift arm, the fork assembly comprising a second frame and a carriage operative to move between a first position and a second position with respect to the second frame, the carriage carrying a pair of tines;

wherein the carriage comprises at least one tube telescopically received within at least one corresponding sleeve of the second frame;

wherein each tine extends generally orthogonally from the carriage through a respective slot defined in the second frame; and the fork assembly further comprising at least one second actuator coupled with the carriage;

wherein movement of the at least one second actuator causes the carriage to move with respect to the second frame between the first and second positions.

9. The container handler of claim 8, wherein the first frame is coupled with a chassis of a vehicle.

10. The container handler of claim 8, wherein the at least one second actuator is coupled between the second frame and the carriage, wherein the at least one second actuator is operative to translate the carriage between the first and second positions.

11. The container handler of claim 10, wherein the at least one first actuator and the at least one second actuator are in fluid communication with a hydraulic system of the container handler.

12. The container handler of claim 10, wherein the at least one second actuator comprises two rod-type hydraulic cylinders.

13. The container handler of claim 8, further comprising at least one third actuator actuatable to cause pivotal movement of the fork assembly with respect to the at least one lift arm.

14. The container handler of claim 8, wherein the pair of tines are configured to engage one or more pockets on a container.

15. A vehicle, comprising:
a chassis;
at least one lift arm pivotably coupled with the chassis, the at least one lift arm movable between a stowed position and an extended position with respect to the chassis based on actuation of at least one first linear actuator coupled between the chassis and the at least one lift arm; and
the at least one lift arm further comprising a fork assembly coupled thereto, the fork assembly comprising a frame and a pair of tines;
wherein each of the pair of tines is coupled with at least one first tube, and wherein the frame comprises at least one second tube axially aligned with the at least one first tube;
wherein the frame is pivotable with respect to the at least one lift arm in response to actuation of at least one second linear actuator coupled between the frame and the at least one lift arm;
wherein the tines are operative to translate with respect to the frame in response to actuation of at least one third linear actuator;
wherein the tines are coupled with a carriage, and the third linear actuator is coupled between the carriage and the frame;
wherein the at least one first tube translates within a longitudinal aperture defined in the at least one second tube.

16. The vehicle of claim 15, wherein the first, second, and third linear actuators are in fluid communication with a hydraulic system of the vehicle.

17. A vehicle, comprising:
a chassis;
at least one lift arm pivotably coupled with the chassis, the at least one lift arm movable between a stowed position and an extended position with respect to the chassis based on actuation of at least one first linear actuator coupled between the chassis and the at least one lift arm; and
the at least one lift arm further comprising a fork assembly coupled thereto, the fork assembly comprising a frame and a pair of tines;
wherein each of the pair of tines is coupled with at least one first tube, and wherein the frame comprises at least one second tube axially aligned with the at least one first tube;
wherein the frame is pivotable with respect to the at least one lift arm in response to actuation of at least one second linear actuator coupled between the frame and the at least one lift arm;
wherein the tines are operative to translate with respect to the frame in response to actuation of at least one third linear actuator;
wherein the at least one third linear actuator comprises two hydraulic cylinders.

* * * * *